(12) United States Patent  
McFadden

(10) Patent No.: US 6,575,476 B2
(45) Date of Patent: Jun. 10, 2003

(54) CHUCK FOR HOLDING A HUB ASSEMBLY

(75) Inventor: Daniel E. McFadden, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/892,418

(22) Filed: Jun. 27, 2001

(65) Prior Publication Data

US 2003/0001345 A1 Jan. 2, 2003

(51) Int. Cl.$^7$ ................................................ B23B 31/00
(52) U.S. Cl. .......................................... 279/16; 279/133
(58) Field of Search .......................... 279/16, 133, 132, 279/82, 112

(56) References Cited

U.S. PATENT DOCUMENTS

| | | | | |
|---|---|---|---|---|
| 3,554,080 A | * | 1/1971 | Herrmann | 279/16 |
| 3,778,071 A | * | 12/1973 | Buck | 279/16 |
| 4,021,132 A | * | 5/1977 | Benjamin et al. | 279/16 |
| 5,430,926 A | | 7/1995 | Hartford | |
| 5,915,502 A | | 6/1999 | Rapisardi et al. | |
| 6,071,180 A | | 6/2000 | Becker | |
| 6,158,124 A | | 12/2000 | Austin | |

FOREIGN PATENT DOCUMENTS

| | | |
|---|---|---|
| EP | 1103327 | 11/1999 |
| WO | WO9838436 | 9/1998 |
| WO | WO9858762 | 12/1998 |
| WO | WO0043161 | 7/2000 |
| WO | 0074883 A1 | 12/2000 |

* cited by examiner

Primary Examiner—Steven Wong
(74) Attorney, Agent, or Firm—Polster, Lieder, Woodruff & Lucchesi, L.C.

(57) ABSTRACT

A chuck grips the housing of a hub assembly to hold it fast and further engages a hub spindle that is within the housing and rotates the spindle on a bearing that is between it and the housing so that a flange on the hub may be machined with precision. The chuck includes a fixed base that carries jaws which clamp down on the housing to firmly hold the housing. It also includes a rotatable base and an arbor carried by the rotatable base and engaged with the spindle of the hub to impart the rotation of the hub. The arbor can shift radially with respect to the rotating base to accommodate misalignment between the axes of rotation for the hub and the rotating base. A bearing lies between the arbor and rotating base to resist an axially directed force applied to the arbor to expand it in the hub spindle.

19 Claims, 3 Drawing Sheets

CHUCK FOR HOLDING A HUB ASSEMBLY

BACKGROUND OF THE INVENTION

The present invention relates to chucks, and more particularly, to a chuck for holding a hub assembly and rotating a component of the assembly.

Automotive manufacturers have turned more and more to packaged components in the assembly of their vehicles. Often, outside suppliers provide these components, thus saving the vehicle manufacturers the expense and problems of maintaining manufacturing facilities for them. The hub assemblies for the road wheels of the vehicles represent one type of component which lends itself well to outside manufacture.

Many automobiles and sport utility vehicles of current manufacture have all of their road wheels independently suspended. Packaged hub assemblies function well for mounting the wheels of these vehicles on the independent suspension systems of the vehicles. The typical hub assembly has a hub provided with a flange, to which a road wheel and a brake disk or drum are fastened, and a spindle which projects from the flange into a housing. Here the spindle rotates on a bearing that is within the housing. The housing in turn is bolted to a component of the suspension system, such as a steering knuckle. The bearing normally takes the form of a double row tapered roller bearing or a double row angular contact ball bearing. Either will accommodate radial loads and in addition thrust loads in both axial directions. Moreover, the manufacturers of the hub assemblies normally set the bearings to a condition of slight preload, thus eliminating all radial and axial clearances in the bearings. This enables the hub of a hub assembly to rotate about an axis that is fixed with respect to the housing, but does not eliminate runout (wobble) in the hub flange. And runout in the flange will translate into runout in a brake disk which is against the flange. Runout in a brake disk causes uneven brake wear and creates a pulsating sensation, known as "brake judder", when the brakes are applied.

U.S. Pat. No. 6,158,124 discloses machining the friction surface of a brake disk while it is fastened to its hub and the hub is rotated on its bearing, all while the housing is held fast. U.S. Pat. No. 6,071,180 discloses grinding the face of a hub flange in similar manner. However, gripping the hub to rotate it has always proved troublesome in that the axis of the hub may not coincide with the axis of rotation established by the bearing. This makes it difficult to couple the hub with a chuck designed to rotate it.

SUMMARY OF THE INVENTION

The present invention resides in a chuck having a fixed member that carries jaws that are capable of gripping the housing of a hub assembly and a rotatable member to which an arbor is coupled, with the arbor being capable of engaging a hub that rotates in the housing on a bearing. The arbor has the capacity to shift radially with respect to the rotatable member to accommodate misalignment between the axes of rotation for the rotatable member and the hub. The invention also resides in the combination of the chuck and the hub assembly.

DETAILED DESCRIPTION

Figure 1:
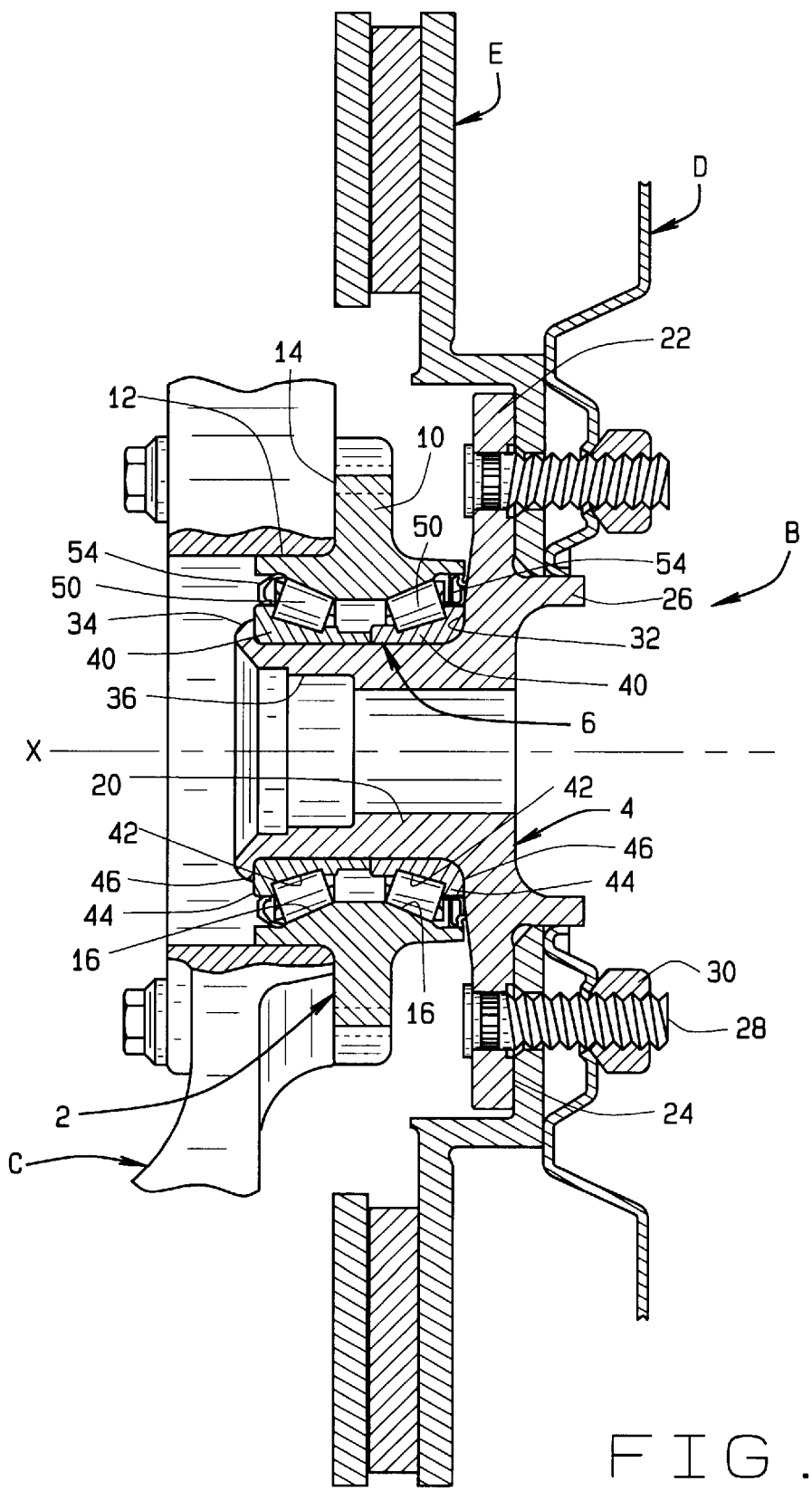
FIG. 1 is a longitudinal sectional view of a hub assembly which is held and rotated in the chuck of the present invention.

Referring now to the drawings, (FIG. 2) a chuck A clamps down on a component of a hub assembly B and further rotates another component of the hub assembly B, so that a surface on that other component—or for that matter a surface carried by that other component—may be machined. The hub assembly B (FIG. 1) is furnished as a package ready for installation on a component C of a vehicular suspension system. The hub assembly B later has a road wheel D and a brake disk E attached to it. The suspension system component C may take the form of a steering knuckle, in which event it has the capacity to pivot about a generally vertical axis as well as move vertically, or it may simply move vertically. In the former configuration it is suitable for use with front wheels D that steer the vehicle, whereas in the latter configuration it is suitable for trailing rear wheels D.

Irrespective of the configuration and capabilities of the suspension system component C on which the hub assembly B is mounted, the hub assembly B, which the chuck A holds and rotates prior to installation on the suspension system component C, includes (FIG. 1) a housing 2, a hub 4 and a bearing 6 that is located between the housing 2 and hub 4 to enable the hub 4 to rotate on the housing 2 about an axis X with minimal friction. The housing 2 is configured to be attached securely to the suspension system component C during the assembly of the vehicle, whereas the hub 4 is configured to accommodate the brake disk E and the road wheel D. The bearing 6 transfers both radial and thrust loads in both axial directions between the housing 2 and the hub 4.

The housing 2 on its exterior has a triangular or rectangular flange 10 and a machined cylindrical surface 12 that extends from the flange 10 to the inboard end of the housing 2. The flange 10 has a machined end face 14 that lies perpendicular to the cylindrical surface 12. The segment of the housing 2 lying inwardly from the flange 10, that is the segment having the machined surface 12, fits into the suspension system component C, thus bringing the end face 14 on the flange 10 against the component C to which it is secured with cap screws that thread into its lobes. On its interior, the housing 2 has a pair of tapered raceways 16 which taper downwardly toward each other and thus have their largest ends at the ends of the housing 2. The raceways 16 actually form part of the bearing 6 and in a sense the housing 2 constitutes the outer race of the bearing 6.

The hub 4 includes a spindle 20 which extends into the housing 2 and a flange 22 formed integral with the spindle 20 at the outboard end of the spindle 20. The flange 22 extends radially outwardly just past the flange 10 on the housing 2. It has a mounting surface 24 which is presented outwardly away from housing 2 and spindle 20 and is machined such that it lies in a plane that is perpendicular to the axis X. The mounting surface 24 surrounds a wheel pilot 26 which projects axially beyond the surface 24. Moreover, the flange 22 has several threaded studs 28 fitted to it and they likewise project axially beyond the mounting surface 24. The brake disk E fits over the threaded studs 28 and around the wheel pilot 26 so that it bears against mounting surface 24. The wheel D fits over the studs 28 and against the brake disk E. It also fits around the pilot 26 which serves to center it. The brake disk E and wheel D are clamped tightly to the flange 22 by lug nuts 30 which thread over the studs 28.

On its opposite face, that is its inboard face, the flange 22 has a shoulder 32 where it merges into the spindle 20. At its inboard end, the spindle 20 turns outwardly away from the axis X in the provision of a formed end 34. The spindle 20 is hollow and internally has a machined cylindrical bore 36 that opens out of the formed end 34. It may also have an internal spline located beyond the bore 36.

The bearing 6 fits around the spindle 20 between the shoulder 32 and the formed end 34 and also fits within the housing 2. It includes an inner race in the form of two cones 40—one an outboard cone 40 that is against the shoulder 32 and the other an inboard cone 40 that is against the formed end 34. Each cone 40 has a tapered raceway 42 and a thrust rib 44 at the large end of the tapered raceway 42. The thrust rib 44 of each cone 40 extends out to a back face 46 that is squared off with respect to the axis X. The two cones 40 fit over the spindle 20 with an interference fit and with the back face 46 of the outboard cone 40 against the shoulder 32 and the back face of the inboard cone 40 against the formed end 34.

With the two cones 40 so disposed, the tapered raceway 42 of the outboard cone 40 is presented toward the outboard raceway 16 on the housing 2 and inclined in the same direction as that raceway 16. The raceway 42 of the inboard cone 40 is presented toward the inboard raceway 16 on the housing 4 and inclined in the same direction as that raceway 16. The opposite ends, that is to say the front faces, of the two cones 40 abut generally within the center of the housing 2.

In addition to the two cones 40 and the raceway 16 of the housing 2, the bearing 6 includes tapered rollers 50 arranged in two rows, there being an outboard row between outboard raceways 16 and 42 and an inboard row between the inboard raceways 16 and 42. The rollers 50 contact the raceways 16 and 42 along their tapered side faces, there being basically line contact here, and they bear against the thrust ribs 44 at their large end faces. Indeed, the thrust ribs 44 prevent the rollers 50 from being expelled from the opposed raceway 16 and 42. Moreover, the rollers 50 in each row are on apex, meaning that the envelopes of all rollers in a row will have their apices at a common point along the axis X. Furthermore, the bearing 6 exists in a condition of preload, which means that no radial or axial clearances exists within it, this being achieved by grinding the front face of one of the cones 40, if necessary.

Beyond its two raceways 16, the housing 2 is fitted with seals 54 which establish fluid barriers along the thrust ribs 44 of the two cones 40—barriers which retain a lubricant within the bearing 6 and exclude contaminant from it.

The formed end 34 unitizes the hub assembly B and is produced only after the two cones 40 and the housing 2 are installed over the spindle 20 of the hub 4. Initially, the spindle 20 of the hub extends from the shoulder 32 to its free end as a cylindrical surface capable of accommodating the cones 40. First, the outboard cone 40 is installed over the extended spindle 20, then the housing 2, and then the inboard cone 40. With the two cones 40 and the housing 2 in place a segment of the spindle 20 projects beyond the back face 46 of the inboard cone 40. This segment is deformed into the formed end 34. PCT application GB 98/01923 (International Publication No. WO98/58762), discloses a rotary forming process for upsetting the initially extended end of the spindle 20 and converting that end into the formed end 34 which captures the cones 40 on the spindle 20 and in effect unitizes the entire hub assembly B. The hub assembly B may also be unitized with a nut threaded over the end of the spindle 20.

The preload that exists within the bearing 6 assures stability between the fixed housing 2 and the rotating hub 4, that is to say, the axis X remains fixed with respect to the housing 2. But the presence of preload does not assure that the mounting surface 36 will rotate without runout—in other words, wobble—and any runout in the mounting surface 24 is imparted to the brake disk E which is machined separately from the hub assembly B. To assure that the mounting surface 24 revolves without runout, the surface 24 is machined while the hub 4 rotates in the housing 2 on the preloaded bearing 6. During the machining of the surface 24 the chuck A holds the housing 2 fast and further rotates the hub 4.

Figure 2:
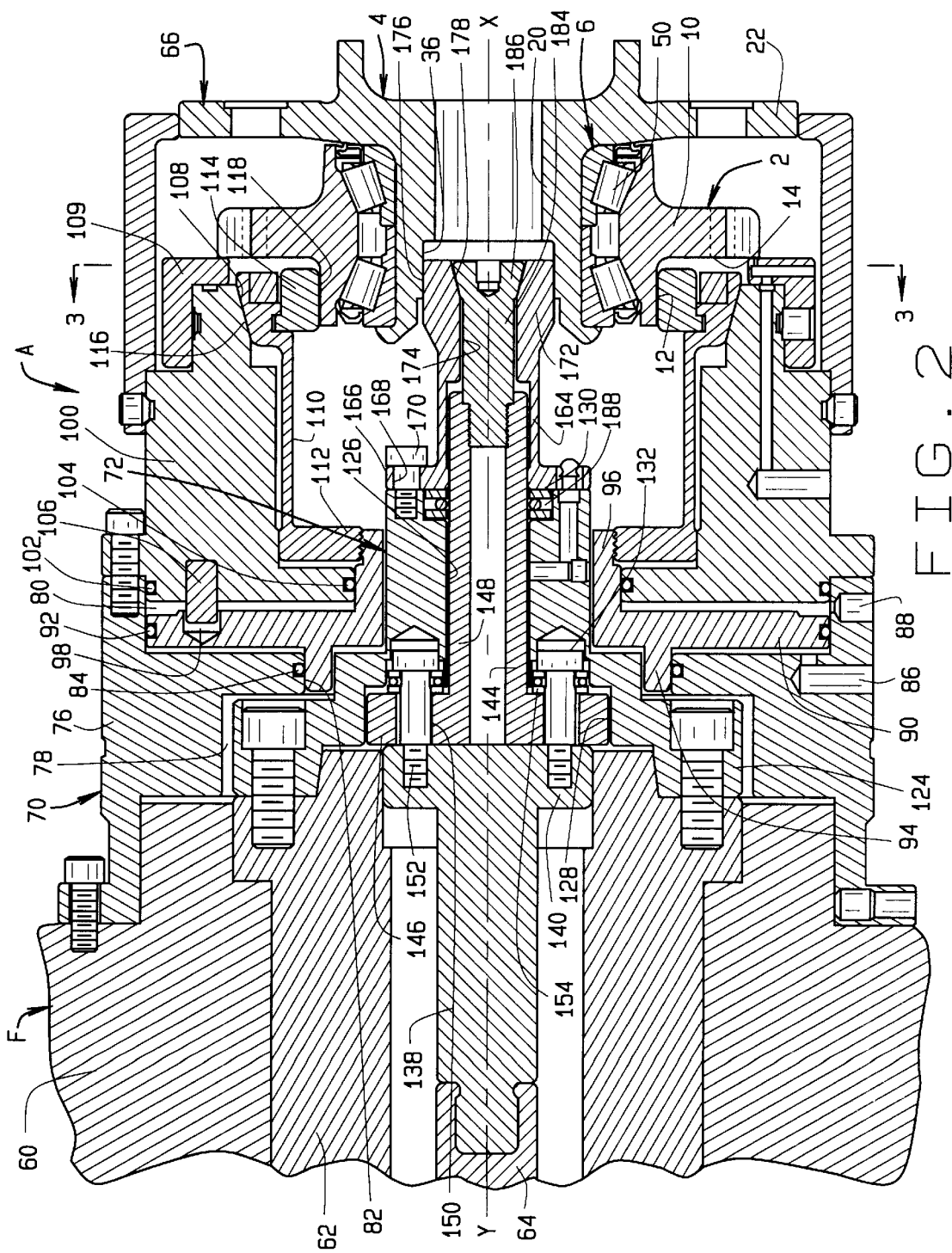
FIG. 2 is a longitudinal sectional view of the chuck with the hub assembly fitted to it.

The chuck A is fitted to a machine tool F having a headstock 60 and a spindle 62 which rotates in the headstock 60 about an axis Y (FIG. 2). The spindle 62 is hollow and contains a hydraulically operated draw bar 64. The machine tool F also has a cutting tool 66 which it advances radially with respect to the axis Y. The chuck A includes a clamping section 70 which is fastened firmly to the headstock 60 of the machine tool F and a mandrel 72 which is connected to the spindle 62 for rotation with it. The clamping section 70 clamps down on and grips the housing 2 of the hub assembly B, holding it fast, whereas the mandrel 72 engages the hub 4 of the hub assembly B and rotates it.

Considering the clamping section 70 first, it includes a base 76 which is fastened firmly to the headstock 60 and has a cylindrical cavity 78, which opens toward the spindle 62 and receives the mandrel 72. In addition, the base 76 has a cylindrical bore 80 which opens away from the spindle 62. Between the cavity 78 and the bore 80 is a cylindrical intervening surface 82 along which an O-ring seal 84 is located. The base 76 also contains two ports 86 and 88, the former of which opens into the bore 80 at the closed end of the bore 80 and the later into the bore 80 near its opposite end.

The cylindrical bore 80 of the base 76 contains a piston 90 which has an O-ring seal 92 that wipes the surface of the bore 80 between the two ports 86 and 88. The piston 90 also has an annular rib 94 which projects rearwardly along the intervening surface 82 of the base 76 where the O-ring seal 84 wipes it. The piston 90 possesses an annular configuration and along its hollow center has an annular nose 96 which projects forwardly around the mandrel 72. Finally, the piston 90 contains several sockets 98 which open out of its forward face.

The piston 90 lies behind an annular jaw carrier 100 that is fastened firmly against the base 76 with machine screws and has an outer O-ring seal 102 that effects a static seal with the surface of the bore 80 in the base 76 and an inner O-ring seal 104 which establishes a live seal with the nose 96 on the piston 90. The back of the carrier 100 in effect closes the end of cylindrical bore 80 around 96 of the piston 90, so that the piston 90 divides the bore 80 into two chambers—one a back chamber into which the port 86 opens and the other a front chamber into which the port 88 opens.

The jaw carrier 100 has dowels 106 which project from its back face into the sockets 98 of the piston 90 to prevent the piston 90 from rotating in the cylindrical bore 80. Yet the dowels 106 do not impede axial displacement of the piston 90 in the bore 80. The carrier 100 projects forwardly beyond the base 76 and beyond the nose 96 of the piston 90 and at its forward end is provided with a beveled camming surface 108 which is presented inwardly toward the axis Y. Here, the carrier 100 is also fitted with a stop ring 109 which is attached firmly to it.

Figure 3:
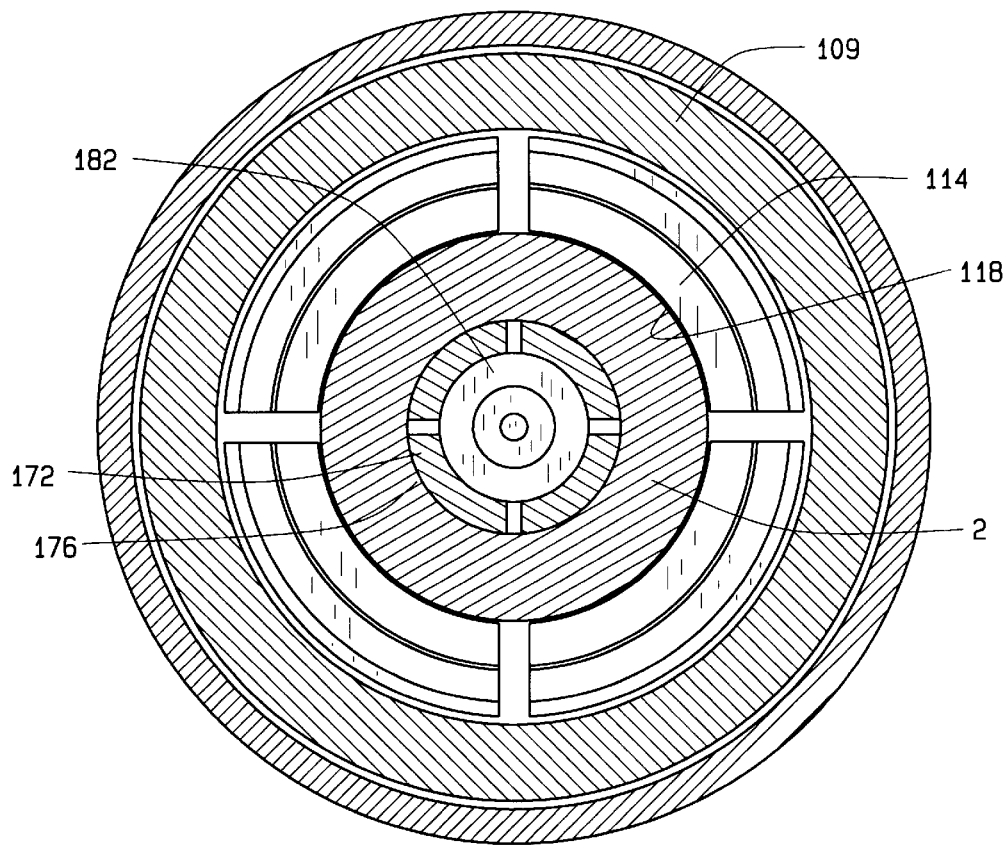
FIG. 3 is a sectional view of the chuck taken along line 3—3 of FIG. 2.

Within the carrier 100 is a clamping member 110 having a solid annular end 112 which threads over the nose 96 on the piston 90. In addition, the clamping member 110 has several jaws 114 (FIGS. 2 and 3) which are formed integral with and extend forwardly from the annular end 112, terminating within the beveled camming surface 108 of the carrier 100. Each jaw 114 has a beveled outside face 116 which bears against the camming surface 108 of the carrier 100 and an arcuate gripping surface 118 that is presented inwardly toward the axis Y. The contour of each gripping surface 118 matches the contour of the machined cylindrical surface 12 on the housing 2 of the hub assembly B.

When pressurized fluid, such as compressed air, is admitted to the port 86 behind the piston 90, the piston 90 moves forwardly and the jaws 114, owing to the resiliency of the metal from which they are formed, follow the camming surface 108 and spread apart. On the other hand, when pressurized fluid is admitted to the port 88, the piston 90 moves rearwardly and carries the clamping member 110 with it. The beveled camming surface 108 bears against the jaws 114 and urges them together, causing the envelope formed by the gripping surfaces 118 to contract.

Turning now to the mandrel 72 (FIG. 2), it has a base 124 which is secured firmly against the front face of the machine tool spindle 62 with machine screws, and projects forwardly in a stepped configuration from the spindle 62. Indeed, it extends into the cavity 78 of the clamping section base 76, then into the rib 94 on the piston 90 and finally completely through the nose 96 of the piston 90. Enough clearance exists between the mandrel base 124, on one hand, and the clamping section base 76 and piston 90, on the other hand, to enable the mandrel base 124 to rotate freely within the clamping section base 76 and piston 90. The mandrel base 124 also has a throughbore 126, a large counterbore 128 at the back end of the throughbore 126, and a smaller counterbore 130 at the forward end. In addition, at the large counterbore 128 it has sockets 132 which open into the counterbore 128 and toward the machine tool spindle 62. The exterior surface of the mandrel base 124 as well as the throughbore 126 and the two counterbores 128 and 130 all are concentric and share the axis Y of the machine tool spindle 62 as their common center.

The mandrel 72 also includes a draw bar adapter 138 which constitutes an extension of the draw bar 64. Indeed, the adapter 138, in effect, extends the draw bar 64 to the forward face of the machine tool spindle 62 where the adapter 138 has an enlarged end 140 that is free to shift axially within the spindle 62, but for all intents and purposes not radially. The adapter 138 rotates with the spindle 62 about the axis Y.

Figure 4:
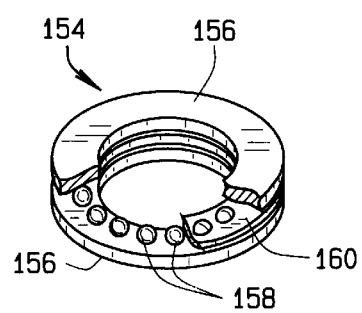
FIG. 4 is a perspective view, partially broken away and in section, of a bearing forming part of the chuck.

In addition to the mandrel base 124 and the draw bar adapter 138, the mandrel 72 includes a connector 144 which for the most part is confined within the mandrel base 124, although it does project forwardly out of the forward end of the base 124. The connector 144 has the capacity to shift radially a small distance within the base 124 and axially an even greater distance, the latter being a consequence of actuation of the draw bar 64. The connector 144 includes a head 146 which is confined to the large counterbore 128 of the mandrel base 124 and a cylindrical shank 148 which extends from the head 146 through the throughbore 126 and small counterbore 130 and beyond the forward end of the mandrel base 124. The diameter of the throughbore 126 exceeds the diameter of the shank 148 and likewise the diameter of the large counterbore 128 exceeds the diameter of the head 146, the differences in diameter being such that the connector 144 can shift laterally from a centered position a distance of at least 0.020 in. in any direction. Moreover, the depth of the large counterbore 128 exceeds the axial dimension of the head 146 by about at least 0.160 in., so the maximum stroke of the connector 144 in the mandrel base 124 is 0.160 in. The head 146 contains several axially directed bores 150 which receive shoulder bolts 152 that thread into the head 140 of the draw bar adapter 138—indeed, until the shoulders on those bolts 152 bear firmly against the enlarged end 140 of the draw bar adapter 138. The smooth shanks of the shoulder bolts 152 lie within the bores 150 of the connector head 146 and the differences in diameter between the shanks of the bolts 152 and the bores 150 are such that the head 146 of the connector 144—and indeed, the entire connector 144—can move at least 0.020 off the axis Y for the mandrel 72. The heads of the shoulder bolts 152 fit within the sockets 132 of the mandrel base 124, and this enables the connector 144 to rotate with the base 124. Fitted around the shank of each shoulder bolt 152, between the head of the bolt 152 and the front face of the head 146 for the connector 144, is a bearing 154 which transfers the axially directed force exerted on the draw bar adapter 138 by the draw bar 64 to the connector 144, while enabling the connector 144 to move laterally in the mandrel base 124 with minimal friction. Thus, the shoulder bolts 152 function as draw elements for drawing the connector 144 inwardly. Each bearing 154 includes (FIG. 4) a pair of flat washers 156, rolling elements in the form of hardened balls 158 between the washers 156, and a cage 160 located between the washers 156 and having pockets which receive the balls 158 and maintain a uniform spacing between them. One of the washers 156 bears against the front face of the connector head 146, while the other bears against the underside of the head on the shoulder bolt 152.

The shank 148 of the connector 144 projects beyond the front end of the mandrel base 124 where it is received in an arbor 164 that extends forwardly to the region of the jaws 114 on the clamping section 70. Just enough clearance exists between the connector shank 148 and the interior surface of the arbor 164 to enable the shank 148 to shift axially in the arbor 164 without binding. In this region the arbor 164 has a flange 166 provided with several axial bores 168 through which more shoulder bolts 170 extend. The bolts 170 thread into the end of the mandrel base 124, with their shoulders bearing against the front face of the mandrel base 124 and their heads over, although not tightly against, the front face of the flange 166. Moreover, the diameter of the axial bore 168 exceeds the diameter of the shanks on the bolts 170 sufficiently to enable the arbor 164 and the connector shank 148 confined by it to shift laterally at least 0.020 in. in any direction off the axis Y of the mandrel 72. The arbor 164 at its opposite end includes an enlarged head 172 through which a bore 174 extends. The head 172, which is segmented by radial slots (FIG. 3), has arcuate gripping surfaces 176 on its exterior and beveled camming surfaces 178 at the end of the bore 174. When the head 172 of the arbor 164 is undistorted, the diameter of the gripping surface 176 is just small enough to fit into the machined bore 36 at the end of the hub spindle 20 for the hub assembly B.

The bore 174 of the arbor 164 receives an expander 184 having a beveled end 186 which bears against the beveled camming surfaces 178 of the arbor 164. The opposite end of the expander 184 is threaded into the end of the shank 148 on the connector 144. Thus, an axially directed force exerted by the draw bar 64 is transferred through the draw bar adapter 138 and connector 144 to the expander 184 which retracts within the arbor 164. In doing so, the beveled end of the expander 184 moves along the camming surfaces 178 in the head 172 of the arbor 164, causing the head 172 to expand and increase the diameter of the envelope formed by the arcuate gripping surfaces 176. Hence, the connector 144 and expander 184 comprise an actuating member for expanding the enlarged head 172 of the arbor 164.

Figure 5:
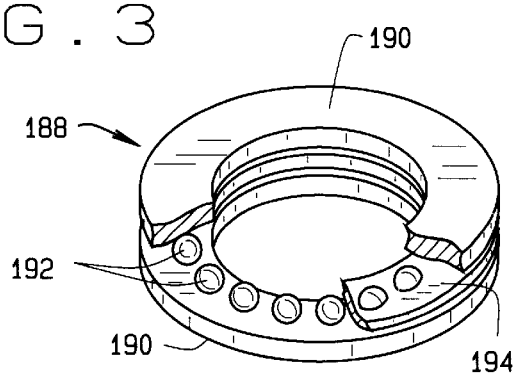
FIG. 5 is a perspective view, partially broken away and in section, of another bearing forming part of the chuck.

The expander 184, of course, exerts an axially directed force on the arbor 164 and that force is resisted by the mandrel base 124, it being transferred to the base 124 through a bearing 188 located in the small counterbore 130 at the front of the base 124. The bearing 188 likewise has (FIG. 5) a pair of flat washers 190 with balls 192 located between them and a cage 194 separating the balls 192 so that they remain uniformly spaced. The bearing 188 is thick enough to back the flange 166 of the arbor 164 slightly away from the front face of the mandrel base 124, yet not so thick as to force it against the heads of the shoulder bolts 170. Thus, the flange 166 floats, so to speak, at the end of the mandrel base 124.

Indeed, the loose fits between the shanks of the shoulder bolts 152 and the axial bores 150 in the head 146 of the connector 144 and the loose fits between the shanks of the shoulder bolts 170 and the flange 166 of the arbor 164, together with the bearings 154 and the bearing 188 enable the connector 144, the arbor 164 and the expander 184 to float as a unit in and on the mandrel base 124, even though an axial directed force is transferred through the draw bar adapter 138 and connector 144 to the expander 184.

To prepare the chuck A for machining the mounting surface 36 that forms the front face of the flange 22 on the hub 4 of the hub assembly B, compressed air is admitted to the port 86 in the base 76 of the clamping section 70. This drives the piston 90 and clamping member 110 forwardly away from the headstock 60 and spindle 62. The beveled outside faces 116 of the jaws 114 ride up the camming surface 108 of the carrier 100 and the jaws 114 expand under the resiliency of the clamping member 110. Also, the draw bar 64 is driven forwardly, shifting the connector 144 and expander 184 forwardly as well. The head 172 of the arbor 164, owning to resilience of the arbor 164, assumes a contracted configuration.

With the chuck A so configured, the hub assembly B is installed on it. In particular, the housing 2 of the hub assembly B, with its inboard end leading is inserted into the open jaws 114 on the clamping section 70 and advanced until the machined end face 14 on the flange 10 bears against the stop ring 109 on the jaw carrier 100. When the housing 2 is aligned with the open jaws 114, the machined bore 36 at the inboard end of the hub spindle 20 aligns with the head 172 at the end of the arbor 164. As the housing 2 advances into the jaws 114, the arbor head 172 advances into the machined bore 36.

Once the housing flange 10 is against the stop ring 109, the pressure at the port 86 in the clamping section base 76 is relaxed and compressed air is admitted to the other port 88. This draws the piston 90 and the clamping member 110 rearwardly. The beveled outside faces 116 of the jaws 114 on the clamping member 110 move over the camming surface 108 on the carrier 100, and the jaws 114 contract. Their gripping surfaces 118 bear firmly against the machined cylindrical surface 12 on the exterior of the housing 2 for the hub assembly B. The end face 14 on the flange 10 of the housing 2 remains against the stop ring 109.

Moreover, the draw bar 64 is energized, and it retracts the draw bar adapter 138 in the machine tool spindle 62. The connector 144 also retracts in the mandrel base 124 and draws the expander 184 farther into the arbor 164, causing its beveled head 186 to move against the camming surfaces 178 in the enlarged head 172 of the arbor 164. The arbor head 172 expands and its gripping surfaces 176 bear firmly against the surface of the machine bore 36 in the hub spindle 20.

With the jaws 114 clamped against the housing 2 and the arbor 164 engaged with the hub spindle 20, the machine tool spindle 62 is energized. It rotates the mandrel base 124 about the axis Y, and the mandrel base 124 in turn rotates the arbor 164. Being firmly engaged with the hub spindle 20, the arbor rotates the hub 4 about the axis X. Since the bearing 6, which accommodates the rotation of the hub 4 is set to preload, the axis X remains fixed with respect to the housing 2 and the clamping section 70 which holds the housing 2. However, the axis X about which the hub 4 rotates may not coincide with the axis Y about which the machine tool spindle 62 rotates. The floating connector 144 and arbor 164 accommodate any misalignment between the axes X and Y. After all, the clearance between the shanks of the shoulder bolts 152 and the bores 150 through which they extend in the head 146 of the connector 144, and likewise the clearance between the shanks of the shoulder bolts 170 and the axial bores in the flange 166 of the arbor 164 enable the connector 144 and the arbor 164 to shift laterally in and on the mandrel base 124. The bearings 154 and 188 enable the axial force exerted by the draw bar 64 to be transmitted to the arbor expander 184 and to be resisted by the mandrel base 124 notwithstanding the float of the connector 124 and arbor 164.

What is claimed is:

1. A chuck for holding a fixed component of a hub assembly and rotating a rotatable component of the assembly so that a surface on the rotatable component may be machined, said chuck comprising: a clamping section including a base and jaws supported on the base, with the jaws being capable of moving between open and closed positions; and a mandrel that is rotatable in the clamping section base about a fixed mandrel axis and includes a mandrel base and an arbor mounted on the mandrel base and being capable of assuming an engaged configuration, the arbor being capable of moving radially with respect to the mandrel base, the mandrel also including a first bearing located between the arbor and the mandrel base for transmitting axial loads between the arbor and the mandrel base while allowing the arbor to shift radially on the base.

2. A chuck according to claim 1 wherein the first bearing includes spaced apart surfaces that are perpendicular to the axis and rolling elements between the surfaces.

3. A chuck according to claim 2 wherein the arbor is expanded when in its engaged configuration.

4. A chuck according to claim 3 wherein the mandrel further comprises an actuating member located within the mandrel base and the arbor and being configured to expand the arbor when an axially directed force is applied to it; and wherein the actuating member can move radially relative to the mandrel axis to follow the radial displacement of the arbor.

5. A chuck according to claim 4 wherein the arbor has camming surfaces located within its interior, with the camming surfaces being oblique to the axis, and the actuating member includes an expander located within the arbor and having a surface which bears against the camming surface of the arbor such that when the expander is displaced axially against the camming surfaces, it will expand the arbor.

6. A chuck according to claim 4 wherein the mandrel further comprises draw elements extended through the actuating member for connecting the actuating member with a draw bar, and second bearings located between the draw elements and the actuating member for transferring an axial force to the actuating member while allowing the actuating member to move relative to the axis and follow the radial displacement of the arbor.

7. A chuck according to claim 6 wherein the actuating member has a head provided with a radial surface, and the draw elements have heads which are spaced axially from the radial surface on the head of the actuating member; and wherein the second bearings are located between radial surface on the head of the actuating member and the heads of the draw elements.

8. A chuck according to claim 7 wherein each second bearing includes a pair of flat surfaces that are perpendicular to the mandrel axis and rolling elements between the flat surfaces.

9. A chuck according to claim 4 wherein the clamping section further includes a piston that moves axially in the clamping section base and a camming surface that is fixed in position with respect to the clamping section base and is against the outside surfaces of the jaws; and wherein the jaws are coupled to the piston such that when the piston moves the jaws along the camming surface, the jaws move radially.

10. A chuck for gripping a housing of a hub assembly and holding it fast and for engaging and rotating a hub of the hub assembly about a first axis so that a surface of the hub assembly may be machined, said chuck comprising: a fixed member having a camming surface that is oblique to the first axis, a piston located in the fixed member; jaws along the camming surface and coupled with the piston so that the piston moves the jaws along the camming surface and causes the jaws to open or close; a rotating base located in the fixed member for rotation about a second axis; an arbor mounted on the rotating base such that it can be displaced radially with respect to the rotating base and having an internal camming surface that is oblique to the second axis; an actuating member extended from the rotating base into the arbor and having an expander located along the camming surfaces of the arbor such that when the expander is drawn against the camming surfaces, it expands the arbor; and a first bearing between the mandrel base and the arbor and configured to accommodate radial displacement between the arbor and the rotating base when the first axis does not coincide with the second axis.

11. A chuck according to claim 10 wherein the actuating member is capable of moving radially within the rotating base to follow radial displacement of the arbor.

12. A chuck according to claim 11 and further comprising draw elements extended from the actuating member to exert an axially directed force on the actuating member, and second bearings between the draw elements and the actuating member to accommodate radial displacement of the actuating member.

13. A chuck according to claim 12 in combination with a head stock and a spindle which rotates in the head stock and contains a draw bar, wherein the fixed member is mounted on the head stock, the rotating member is mounted on the spindle, and the draw elements are connected to the draw bar.

14. In combination with the hub assembly having a housing, a hub provided with a spindle that extends into the housing and a flange at the end of the spindle, and a bearing located between the housing and the spindle of the hub to enable the hub to rotate on the housing about a first axis, a chuck for holding housing of the hub assembly and rotating the hub, said chuck comprising: a fixed base; jaws carried by the fixed base and encircling and gripping the housing to hold the housing fast; a rotating base which rotates about a second axis that is parallel to the first axis; an arbor carried by the rotating base and coupled to the hub for rotation with the hub about the first axis, the arbor being mounted on the rotating base such that it rotates with the base, yet can be displaced radially with respect to the rotating base to accommodate for misalignment between the first and second axes.

15. The combination according to claim 14 and further comprising an actuating member located in the rotating base and extended into the arbor where it is configured such that it will expand the arbor when an axially directed force is applied to it, and a first bearing located between the arbor and the rotating base for transferring an axially directed force form the arbor to the base while allowing the arbor to move radially with respect to the rotating base.

16. The combination according to claim 15 wherein the first bearing includes a flat washer against the arbor, another flat washer against the rotating base, and rolling elements between the flat washers.

17. The combination according to claim 15 wherein the actuating member is capable of moving radially in the rotating member to follow the radial displacement of the arbor; and further comprising draw elements connected to the actuating member for applying an axially directed force to the actuating member.

18. The combination according to claim 17 wherein the draw elements rotate about the second axis; and further comprising second bearings between the draw elements and actuating member to accommodate misalignment between the first and second axes.

19. The combination according to claim 18 and further comprising a head stock on which the fixed member is mounted, a tool spindle located within the head stock where it rotates about the second axis, the rotating member being mounted on the tool spindle, and a draw bar mounted in the tool spindle and capable of exerting an axially directed force, the draw elements being connected with the draw bar.

* * * * *